Patented Sept. 4, 1928.

1,683,105

UNITED STATES PATENT OFFICE.

WALTER SCHOELLER, OF BERLIN-WESTEND, AND HANS GEORG ALLARDT, OF BERLIN-REINICKENDORF-WEST, GERMANY, ASSIGNORS TO THE FIRM CHEMISCHE FABRIK AUF ACTIEN (VORM. E. SCHERING), OF BERLIN, GERMANY.

METALLO MERCAPTO COMPOUNDS AND PROCESS OF MAKING SAME.

No Drawing. Application filed February 19, 1927, Serial No. 167,351, and in Germany February 17, 1926.

Our invention relates to metallo mercapto compounds and to the method of making same.

We have found that water-soluble metallo mercapto compounds can be obtained, if a salt of a heavy metal is caused to act in a neutral, acid or alkaline medium on a mercapto compound, the molecule of which contains besides sulfhydryl groups a plurality of hydroxyl groups and eventually one or more other substituents, such as for instance the aldehyde group in the case of sugars.

The new compounds, which are water-soluble in proportion to the number of hydroxyl groups, correspond to the general formula R—S-Me, wherein R is the radicle of a compound containing several hydroxyl groups, while Me is a heavy metal.

Example 1.

12.5 grams 1-thioglucose are dissolved in 200 ccms. water. To this solution is added a quantity of sulfurous acid, corresponding to 1 molecule, for instance 92 ccms. of a 4.4 per cent aqueous solution of sulphur dioxide. A solution of 37.7 grams potassium auribromide in 380 ccms. water is slowly added to the mixture under cooling and stirring, which is continued until the solution has lost its color, whereupon the fourfold volume of alcohol is added to precipitate 1-auro thioglucose, which can be purified by re-dissolving in water and pre-cipitating with alcohol.

This compound is a yellowish amorphous powder, which readily dissolves in water and is insoluble in alcohol, ether and the usual organic solvents. The percentage of gold contained therein was found to be 49.7 (calculated percentage 50.3).

The compound corresponds to the formula

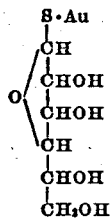

The thioglucose may be replaced by mercapto sugars or other compounds containing besides sulfhydryl groups also a plurality of hydroxyl groups.

Example 2.

20 grams 3-thioglucose are dissolved in 200 ccms. water and an excess of a solution of sulfurous acid, for instance 100 ccms. of a 10 per cent sulfurous acid, is added. The mixture is vigorously cooled and a solution of 55 grams potassium auribromide in 275 ccms. water is slowly added drop by drop as long as the solution is decolored instantly. When no more instant decoloration takes place, the mixture is poured into 4 litres alcohol and filtered. The compound which probably corresponds to the formula

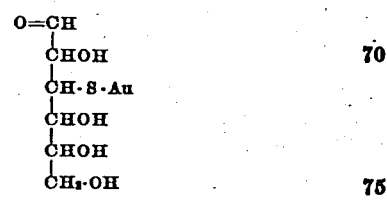

is a yellowish-green powder, insoluble in organic solvents but readily soluble in water. The gold contents was found to be about 49.5 per cent (calculated percentage 50.3).

Other heavy metal compounds can be produced in a similar manner.

Example 3.

34 grams bismuth oxide are dissolved in 60 ccms. concentrated hydrochloric acid. This solution is allowed to slowly flow into a solution of 87 grams 1-thioglucose in 100 ccms. water, the temperature being kept at 0° and the solution being stirred. The mixture is then neutralized accurately with caustic potash and is then poured into 4 litres alcohol. The yellowish-green powder which is precipitated, is filtered by suction and re-dissolved in water and precipitated with alcohol for purification. The 1-bismuth thioglucose thus obtained is readily soluble in water, insoluble in organic solvents and contains about 25.2 per cent bismuth (calculated percentage 26.2).

Example 4.

Into a well-cooled solution of 40 grams 1-thioglucose in 50 ccms. water is slowly introduced drop by drop a solution of 22 grams cadmium chloride in 50 ccms. water. The components are well mixed and the mixture poured into 1.5 litres alcohol. The cadmium salt which is thereby precipitated, is re-dissolved in water and precipitated with alcohol for purification. The 1-cadmium thioglucose thus obtained is a yellowish powder which dissolves readily in water, but only with difficulty in alcohol and other organic solvents. Its cadmium content was found to be 21.8 per cent (calculated percentage 22.3).

The new compounds are adapted for use as pharmaceutical preparations.

Various changes may be made in the details disclosed in the foregoing specification without departing from the invention or sacrificing the advantages thereof.

We claim:—

1. As a new product a water-soluble metallo mercapto compound corresponding to the general formula R—S-Me, wherein R is the radicle of a compound containing, besides a sulf-hydryl group, several hydroxyl groups, while Me is a heavy metal.

2. As a new product an auro mercapto compound corresponding to the general formula R—S-Au, wherein R is the radicle of a compound containing, besides a sulfhydryl group, several hydroxyl groups.

3. As a new compound 1-auro thioglucose, corresponding to the formula

being a yellowish amorphous powder which readily dissolves in water, is insoluble in alcohol, ether and other organic solvents and contains about 50 per cent gold.

4. The method of producing water-soluble metallo mercapto compounds comprising acting with a heavy metal salt on a compound containing in its molecule besides a sulfydryl group also a plurality of hydroxyl groups.

5. The method of producing water-soluble metallo mercapto compounds comprising acting with a heavy metal salt on a compound containing in its molecule besides a sulfhydryl group also a plurality of hydroxyl groups and another substituent.

6. The method of producing a water-soluble auro mercapto compound comprising acting with an auri salt on a compound containing in its molecule besides a sulfhydryl group also a plurality of hydroxyl groups.

7. The method of producing 1-auro thioglucose comprising acting with potassium auribromide on a mixture of 1-thioglucose and sulfurous acid.

8. The method of producing 1-auro thioglucose comprising dissolving 12.5 parts by weight 1-thioglucose in 200 parts water, adding the molecular quantity of a solution of sulphur dioxide, introducing into the mixture a solution of 37.7 parts potassium auribromide in 380 ccms. water and precipitating with alcohol.

In testimony whereof we affix our signatures.

WALTER SCHOELLER.
HANS GEORG ALLARDT.